(12) United States Patent
Meier et al.

(10) Patent No.: US 6,363,471 B1
(45) Date of Patent: Mar. 26, 2002

(54) MECHANISM FOR HANDLING 16-BIT ADDRESSING IN A PROCESSOR

(75) Inventors: Stephan G. Meier, Sunnyvale; Bruce A. Gieseke; William A. McGee, both of San Jose; Ramsey W. Haddad, Cupertino, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/476,323

(22) Filed: Jan. 3, 2000

(51) Int. Cl.⁷ .............................................. G06F 12/00
(52) U.S. Cl. ...................................... 711/220; 708/491
(58) Field of Search .......................... 711/220; 708/491, 708/670

(56) References Cited

U.S. PATENT DOCUMENTS

| | | | |
|---|---|---|---|
| 5,233,553 A | 8/1993 | Shak et al. | 708/491 |
| 5,408,626 A | 4/1995 | Dixit | 711/220 |
| 5,511,017 A | 4/1996 | Cohen et al. | 708/491 |
| 5,612,911 A | 3/1997 | Timko | 708/670 |
| 5,961,580 A | 10/1999 | Mahalingaiah | 708/670 |

Primary Examiner—Do Hyun Yoo
Assistant Examiner—Nasser Moazzami
(74) Attorney, Agent, or Firm—Conley, Rose & Tayon, PC; Lawrence J. Merkel

(57) ABSTRACT

A processor includes an address generation unit (AGU) which adds address operands and the segment base. The AGU may add the segment base and the displacement while other address operands are being read from the register file. The sum of the segment base and the displacement may subsequently be added to the remaining address operands. The AGU receives the addressing mode of the instruction, and if the addressing mode is 16 bit, the AGU zeros the carry from the sixteenth bit to the seventeenth bit of the sums generated therein. Additionally, in parallel, the AGU determines if a carry from the sixteenth bit to the seventeenth bit would occur if the logical address were added to the segment base. In one embodiment, the sum of the address operands and the segment base, with carries from the sixteenth bit to the seventeenth bit zeroed, and the carry generated in parallel are provided to a translation lookaside buffer (TLB), which stores translations in the same format (sum and carry). In another embodiment, the AGU corrects the most significant bits of the generated sum based on the carry. The AGU and/or TLB may provide reduced address generation latency while handling the 16 bit addressing mode as defined in the instruction set architecture.

38 Claims, 9 Drawing Sheets

MECHANISM FOR HANDLING 16-BIT ADDRESSING IN A PROCESSOR

BACKGROUND OF THE INVENTION

1. Field of the Invention

This invention is related to the field of processors and, more particularly, to address generation mechanisms within processors.

2. Description of the Related Art

Processors are generally designed in accordance with an instruction set architecture, which specifies the instructions, the format of the instructions, and other resources used by the processor in executing instructions. Additionally, the instruction set architecture may specify the execution environment, including such features as the address translation mechanism, etc.

A popular instruction set architecture is the x86 instruction set architecture. Due to the wide acceptance of the x86 instruction set architecture in the computer industry, many processor designers select the x86 instruction set architecture when designing processors. The x86 instruction set architecture has been revised over time to expand the capabilities of the instruction set. For example, the x86 instruction set architecture was initially a sixteen bit instruction set architecture: the maximum size operands handled were 16 bit, and memory was addressed using a 16 bit address as well. Over time, the x86 instruction set architecture has been expanded to 32 bits. However, compatibility with the 16 bit mode was maintained to support software written for the earlier instruction set architecture. While compatibility is desirable, it creates complications in the design of processors implementing the instruction set architecture.

One such complication involves the generation of addresses of memory operands. Generally, an instruction may have one or more source operands upon which the instruction operates to produce a result (a destination operand). Operand are register operands if they are stored in a register defined by the instruction set architecture, or memory operands if they are stored in a memory location of a memory to which the processor may be coupled. If an instruction has a memory operand, it typically includes one or more address operands which are used to form the memory address at which the memory operand is stored. The address operands may include, for example, one or more of the following: a displacement (which is a value coded directly into the instruction), a base register operand, and an index register operand. The sum of the address operands forms a logical address. The logical address is translated through a segmentation mechanism to a linear address (also referred to herein as a virtual address). The segmentation mechanism comprises selecting a segment register according to the instruction, and adding a corresponding segment base address (or simply segment base) to the logical address to produce the virtual address. The virtual address may subsequently be translated through a paging mechanism to a physical address. The physical address is the address presented to the memory to identify the corresponding storage location.

It is desireable to generate the virtual addresses as quickly as possible in order to accelerate access to memory operands. However, the generation of virtual addresses is hindered by the existence of multiple addressing modes in the x86 instruction set architecture. The addressing modes are used to provide compatibility with the earlier 16 bit addressing while allowing 32 bit addressing as well. Generally, an addressing mode specifies the number of bits present in the address operands. More particularly, the code segment (which translates logical instruction fetch addresses to linear instruction fetch addresses in a manner similar to the generation of memory operand addresses) specifies a default addressing mode for each instruction. However, using an address override prefix byte, a particular instruction may reverse the default addressing mode. Thus, the addressing mode is determined on an instruction-by-instruction basis.

In the 16 bit addressing mode, the logical address is formed by adding the address operands of the instruction (as 16 bit quantities). Any carries from the sixteenth bit are discarded. The resulting 16 bit logical address is added to the segment base, which is a 32 bit quantity in the present x86 instruction set architecture, respecting any carry into the seventeenth bit of the virtual address sum. On the other hand, in 32 bit addressing mode, the address operands are 32 bit. Accordingly, the virtual address is a 32 bit sum of the segment base and the address operands. The differences in handling 16 bit and 32 bit addressing mode, particularly the discarding of carries when adding the address operands but the preservation of the carry when adding the segment base in 16 bit addressing mode, adds complication to the generation of memory operand addresses. This complication tends to slow the generation of addresses, thereby reducing the speed at which memory operands may be accessed.

SUMMARY OF THE INVENTION

The problems outlined above are in large part solved by a processor as described herein. The processor includes an address generation unit (AGU) which adds address operands and the segment base. The AGU may add the segment base and the displacement while other address operands are being read from the register file. The sum of the segment base and the displacement may subsequently be added to the remaining address operands. The AGU receives the addressing mode of the instruction, and if the addressing mode is 16 bit, the AGU zeros the carry from the sixteenth bit to the seventeenth bit of the sums generated therein. Additionally, in parallel, the AGU determines if a carry from the sixteenth bit to the seventeenth bit would occur if the logical address were added to the segment base. In one embodiment, the sum of the address operands and the segment base, with carries from the sixteenth bit to the seventeenth bit zeroed, and the carry generated in parallel are provided to a translation lookaside buffer (TLB), which stores translations in the same format (sum and carry). In another embodiment, the AGU corrects the most significant bits of the generated sum based on the carry. The AGU and/or TLB may provide reduced address generation latency while handling the 16 bit addressing mode as defined in the instruction set architecture.

Broadly speaking, a processor is contemplated, the processor comprising an AGU. The AGU is coupled to receive a segment base, one or more address operands of an instruction, and a mode signal identifying whether or not an addressing mode of the instruction is 16 bit. The AGU includes adder circuitry configured to add the segment base and the one or more address operands to produce a value, and further configured to zero a carry-in to a seventeenth bit of the value in response to the mode signal indicating that the addressing mode is 16 bit. The AGU further includes a carry circuit configured to generate a first carry signal indicative of a carry-in to the seventeenth bit of a virtual address of a memory operand of the instruction according to an instruction set architecture defining the instruction. The carry circuit is coupled to receive the mode signal and to generate the first carry signal in response to the mode signal. Additionally, a computer system is contemplated including the processor and an input/output (I/O) device configured to communicate between the computer system and another computer system to which the I/O device is couplable.

Moreover, a method is contemplated. One or more address operands of an instruction and a segment base are summed to produce a value, wherein the summing comprises zeroing a carry-in to a seventeenth bit of the value responsive to an addressing mode of the instruction being 16 bit. A first carry-in to the seventeenth bit of a virtual address of a memory operand of the instruction is generated according to an instruction set architecture defining the instruction and in response to the addressing mode.

BRIEF DESCRIPTION OF THE DRAWINGS

Other objects and advantages of the invention will become apparent upon reading the following detailed description and upon reference to the accompanying drawings in which.

Figure 1:
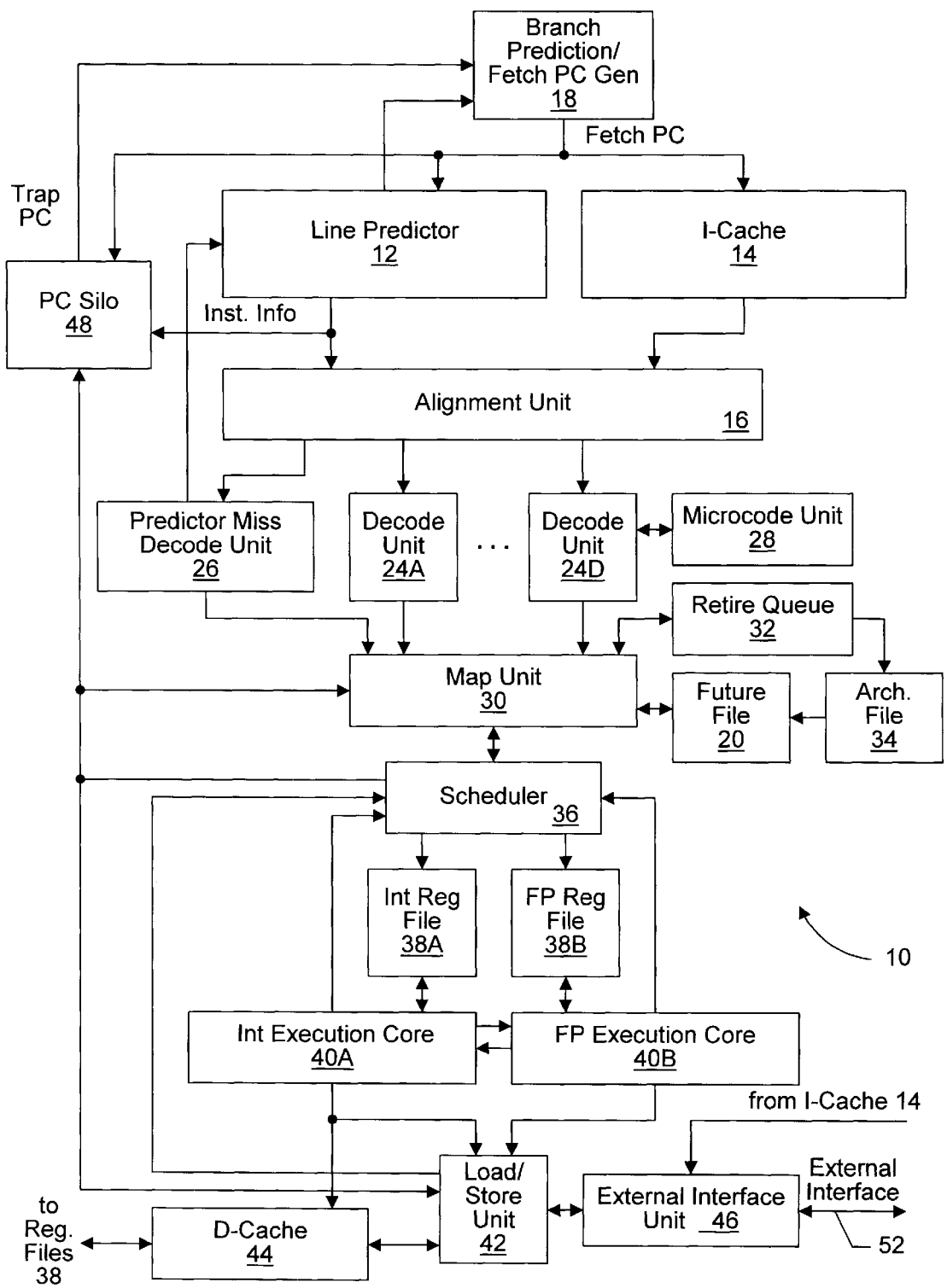
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch prediction/fetch PC generation unit 18, a plurality of decode units 24A–24D, a predictor miss decode unit 26, a microcode unit 28, a map unit 30, a retire queue 32, an architectural renames file 34, a future file 20, a scheduler 36, an integer register file 38A, a floating point register file 38B, an integer execution core 40A, a floating point execution core 40B, a load/store unit 42, a data cache (D-cache) 44, an external interface unit 46, and a PC silo 48. Line predictor 12 is coupled to predictor miss decode unit 26, branch prediction/fetch PC generation unit 18, PC silo 48, and alignment unit 16. Line predictor 12 may also be coupled to I-cache 14. I-cache 14 is coupled to alignment unit 16 and branch prediction/fetch PC generation unit 18, which is further coupled to PC silo 48. Alignment unit 16 is further coupled to predictor miss decode unit 26 and decode units 24A–24D. Decode units 24A–24D are further coupled to map unit 30, and decode unit 24D is coupled to microcode unit 28. Map unit 30 is coupled to retire queue 32 (which is coupled to architectural renames file 34), future file 20, scheduler 36, and PC silo 48. Architectural renames file 34 is coupled to future file 20. Scheduler 36 is coupled to register files 38A–38B, which are further coupled to each other and respective execution cores 40A–40B. Execution cores 40A–40B are further coupled to load/store unit 42 and scheduler 36. Execution core 40A is further coupled to D-cache 44. Load/store unit 42 is coupled to scheduler 36, D-cache 44, and external interface unit 46. D-cache 44 is coupled to register files 38. External interface unit 46 is coupled to an external interface 52 and to I-cache 14. Elements referred to herein by a reference numeral followed by a letter will be collectively referred to by the reference numeral alone. For example, decode units 24A–24D will be collectively referred to as decode units 24.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Branch prediction/fetch PC generation unit 18 is configured to provide a fetch address (fetch PC) to I-cache 14, line predictor 12, and PC silo 48. Branch prediction/fetch PC generation unit 18 may include a suitable branch prediction mechanism used to aid in the generation of fetch addresses. In response to the fetch address, line predictor 12 provides alignment information corresponding to a plurality of instructions to alignment unit 16, and may provide a next fetch address for fetching instructions subsequent to the instructions identified by the provided instruction information. The next fetch address may be provided to branch prediction/fetch PC generation unit 18 or may be directly provided to I-cache 14, as desired. Branch prediction/fetch PC generation unit 18 may receive a trap address from PC silo 48 (if a trap is detected) and the trap address may comprise the fetch PC generated by branch prediction/fetch PC generation unit 18. Otherwise, the fetch PC may be generated using the branch prediction information and information from line predictor 12. Generally, line predictor 12 stores information corresponding to instructions previously speculatively fetched by processor 10. In one embodiment, line predictor 12 includes 2K entries, each entry locating a group of one or more instructions referred to herein as a "line" of instructions. The line of instructions may be concurrently processed by the instruction processing pipeline of processor 10 through being placed into scheduler 36.

I-cache 14 is a high speed cache memory for storing instruction bytes. According to one embodiment I-cache 14 may comprise, for example, a 128 Kbyte, four way set associative organization employing 64 byte cache lines. However, any I-cache structure may be suitable (including direct-mapped structures).

Alignment unit 16 receives the instruction alignment information from line predictor 12 and instruction bytes corresponding to the fetch address from I-cache 14. Alignment unit 16 selects instruction bytes into each of decode units 24A–24D according to the provided instruction alignment information. More particularly, line predictor 12 provides an instruction pointer corresponding to each decode unit 24A–24D. The instruction pointer locates an instruction within the fetched instruction bytes for conveyance to the corresponding decode unit 24A–24D. In one embodiment, certain instructions may be conveyed to more than one decode unit 24A–24D. Accordingly, in the embodiment shown, a line of instructions from line predictor 12 may include up to 4 instructions, although other embodiments may include more or fewer decode units 24 to provide for more or fewer instructions within a line.

Decode units 24A–24B decode the instructions provided thereto, and each decode unit 24A–24D generates information identifying one or more instruction operations (or ROPs) corresponding to the instructions. In one embodiment, each decode unit 24A–24B may generate up to two instruction operations per instruction. As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines (fetched from a read-only memory therein via decode unit 24D in the present embodiment). Furthermore, other embodiments may employ a single instruction operation for each instruction (i.e. instruction and instruction operation may be synonymous in such embodiments).

PC silo 48 stores the fetch address and instruction information for each instruction fetch, and is responsible for redirecting instruction fetching upon exceptions (such as instruction traps defined by the instruction set architecture employed by processor 10, branch mispredictions, and other microarchitecturally defined traps). PC silo 48 may include a circular buffer for storing fetch address and instruction information corresponding to multiple lines of instructions which may be outstanding within processor 10. In response to retirement of a line of instructions, PC silo 48 may discard the corresponding entry. In response to an exception, PC silo 48 may provide a trap address to branch prediction/fetch PC generation unit 18. Retirement and exception information may be provided by scheduler 36. In one embodiment, PC silo 48 assigns a sequence number (R#) to each instruction to identify the order of instructions outstanding within processor 10. Scheduler 36 may return R#s to PC silo 48 to identify instruction operations experiencing exceptions or retiring instruction operations.

Upon detecting a miss in line predictor 12, alignment unit 16 routes the corresponding instruction bytes from I-cache 14 to predictor miss decode unit 26. Predictor miss decode unit 26 decodes the instruction, enforcing any limits on a line of instructions as processor 10 is designed for (e.g. maximum number of instruction operations, maximum number of instructions, terminate on branch instructions, etc.). Upon terminating a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected.

In addition to decoding instructions upon a miss in line predictor 12, predictor miss decode unit 26 may be configured to decode instructions if the instruction information provided by line predictor 12 is invalid. In one embodiment, processor 10 does not attempt to keep information in line predictor 12 coherent with the instructions within I-cache 14 (e.g. when instructions are replaced or invalidate in I-cache 14, the corresponding instruction information may not actively be invalidated). Decode units 24A–24D may verify the instruction information provided, and may signal predictor miss decode unit 26 when invalid instruction information is detected. According to one particular embodiment, the following instruction operations are supported by processor 10: integer (including arithmetic, logic, shift/rotate, and branch operations), floating point (including multimedia operations), and load/store.

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Map unit 30 additionally provides an indication of the dependencies for each instruction operation by providing R#s of the instruction operations which update each physical register number assigned to a source operand of the instruction operation. Map unit 30 updates future file 20 with the physical register numbers assigned to each destination register (and the R# of the corresponding instruction operation) based on the corresponding logical register number. Additionally, map unit 30 stores the logical register numbers of the destination registers, assigned physical register numbers, and the previously assigned physical register numbers in retire queue 32. As instructions are retired (indicated to map unit 30 by scheduler 36), retire queue 32 updates architectural renames file 34 and frees any registers which are no longer in use. Accordingly, the physical register numbers in architectural register file 34 identify the physical registers storing the committed architectural state of processor 10, while future file 20 represents the speculative state of processor 10. In other words, architectural renames file 34 stores a physical register number corresponding to each logical register, representing the committed register state for each logical register. Future file 20 stores a physical register number corresponding to each logical register, representing the speculative register state for each logical register.

The line of instruction operations, source physical register numbers, and destination physical register numbers are stored into scheduler 36 according to the R#s assigned by PC silo 48. Furthermore, dependencies for a particular instruction operation may be noted as dependencies on other instruction operations which are stored in the scheduler. In one embodiment, instruction operations remain in scheduler 36 until retired.

Scheduler 36 stores each instruction operation until the dependencies noted for that instruction operation have been satisfied. In response to scheduling a particular instruction operation for execution, scheduler 36 may determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Scheduler 36 awaits the specified number of clock cycles (until the update will occur prior to or coincident with the dependent instruction operations reading the register file), and then indicates that instruction operations dependent upon that particular instruction operation may be scheduled. It is noted that scheduler 36 may schedule an instruction once its dependencies have been satisfied (i.e. out of order with respect to its order within the scheduler queue).

Integer and load/store instruction operations read source operands according to the source physical register numbers from register file 38A and are conveyed to execution core 40A for execution. Execution core 40A executes the instruction operation and updates the physical register assigned to the destination within register file 38A. Additionally, execution core 40A reports the R# of the instruction operation and exception information regarding the instruction operation (if any) to scheduler 36. Register file 38B and execution core 40B may operate in a similar fashion with respect to floating point instruction operations (and may provide store data for floating point stores to load/store unit 42).

In one embodiment, execution core 40A may include, for example, two integer units, a branch unit, and two address generation units (with corresponding translation lookaside buffers, or TLBs). Execution core 40B may include a floating point/multimedia multiplier, a floating point/multimedia adder, and a store data unit for delivering store data to load/store unit 42. Other configurations of execution units are possible.

Load/store unit 42 provides an interface to D-cache 44 for performing memory operations and for scheduling fill operations for memory operations which miss D-cache 44. Load memory operations may be completed by execution core 40A performing an address generation and forwarding data to register files 38A–38B (from D-cache 44 or a store queue within load/store unit 42). Store addresses may be presented to D-cache 44 upon generation thereof by execution core 40A (directly via connections between execution core 40A and D-Cache 44). The store addresses are allocated a store queue entry. The store data may be provided concurrently, or may be provided subsequently, according to design choice. Upon retirement of the store instruction, the data is stored into D-cache 44 (although there may be some delay between retirement and update of D-cache 44). Additionally, load/store unit 42 may include a load/store buffer for storing load/store addresses which miss D-cache 44 for subsequent cache fills (via external interface unit 46) and re-attempting the missing load/store operations. Load/store unit 42 is further configured to handle load/store memory dependencies.

D-cache 44 is a high speed cache memory for storing data accessed by processor 10. While D-cache 44 may comprise any suitable structure (including direct mapped and set-associative structures), one embodiment of D-cache 44 may comprise a 128 Kbyte, 2 way set associative cache having 64 byte lines.

External interface unit 46 is configured to communicate to other devices via external interface 52. Any suitable external interface 52 may be used, including interfaces to L2 caches and an external bus or buses for connecting processor 10 to other devices. External interface unit 46 fetches fills for I-cache 16 and D-cache 44, as well as writing discarded updated cache lines from D-cache 44 to the external interface. Furthermore, external interface unit 46 may perform non-cacheable reads and writes generated by processor 10 as well.

Figure 2:
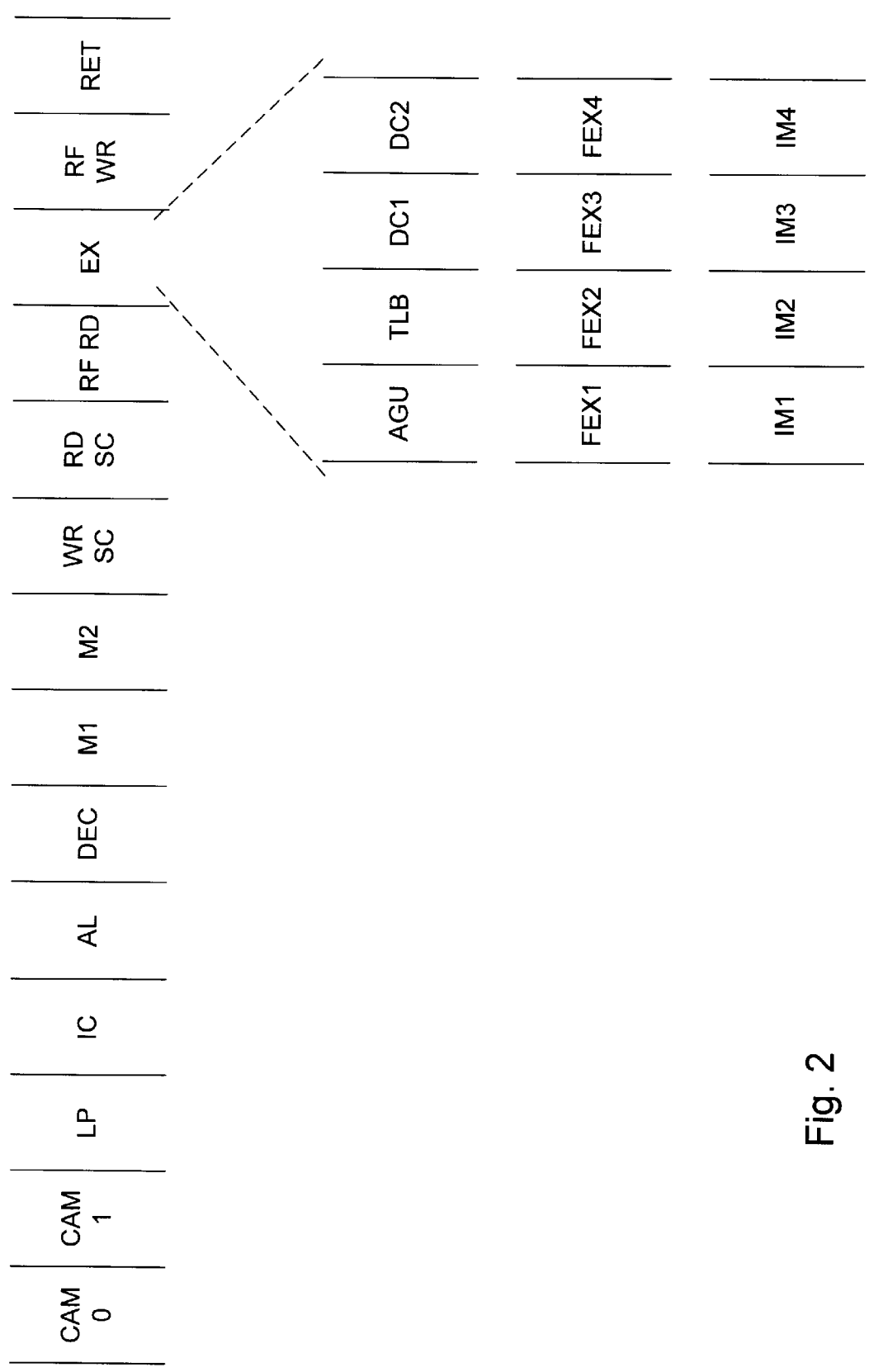
FIG. 2 is a timing diagram illustrating an exemplary pipeline which may be employed by one embodiment of the processor shown in FIG. 1.

Turning next to FIG. 2, an exemplary pipeline diagram illustrating an exemplary set of pipeline stages which may be employed by one embodiment of processor 10 is shown. Other embodiments may employ different pipelines, pipelines including more or fewer pipeline stages than the pipeline shown in FIG. 2. The stages shown in FIG. 2 are delimited by vertical dashed lines. Each stage is one clock cycle of a clock signal used to clock storage elements (e.g. registers, latches, flops, and the like) within processor 10.

As illustrated in FIG. 2, the exemplary pipeline includes a CAM0 stage, a CAM1 stage, a line predictor (LP) stage, an instruction cache (IC) stage, an alignment (AL) stage, a decode (DEC) stage, a map1 (M1) stage, a map2 (M2) stage, a write scheduler (WR SC) stage, a read scheduler (RD SC) stage, a register file read (RF RD) stage, an execute (EX) stage, a register file write (RF WR) stage, and a retire (RET) stage. Some instructions utilize multiple clock cycles in the execute state. For example, memory operations, floating point operations, and integer multiply operations are illustrated in exploded form in FIG. 2. Memory operations include an address generation (AGU) stage, a translation (TLB) stage, a data cache 1 (DC1) stage, and a data cache 2 (DC2) stage. Similarly, floating point operations include up to four floating point execute (FEX1–FEX4) stages, and integer multiplies include up to four (IM1–IM4) stages.

During the CAM0 and CAM1 stages, line predictor 12 compares the fetch address provided by branch prediction/fetch PC generation unit 18 to the addresses of lines stored therein. Additionally, the fetch address is translated from a virtual address (e.g. a linear address in the x86 architecture) to a physical address during the CAM0 and CAM1 stages. In response to detecting a hit during the CAM0 and CAM1 stages, the corresponding line information is read from the line predictor during the line predictor stage. Also, I-cache 14 initiates a read (using the physical address) during the line predictor stage. The read completes during the instruction cache stage.

It is noted that, while the pipeline illustrated in FIG. 2 employs two clock cycles to detect a hit in line predictor 12 for a fetch address, other embodiments may employ a single clock cycle (and stage) to perform this operation. Moreover, in one embodiment line predictor 12 provides a next fetch address for I-cache 14 and a next entry in line predictor 12 for a hit, and therefore the CAM0 and CAM1 stages may be skipped for fetches resulting from a previous hit in line predictor 12.

Instruction bytes provided by I-cache 14 are aligned to decode units 24A–24D by alignment unit 16 during the alignment stage in response to the corresponding line information from line predictor 12. Decode units 24A–24D decode the provided instructions, identifying ROPs corresponding to the instructions as well as operand information during the decode stage. Map unit 30 generates ROPs from the provided information during the map1 stage, and performs register renaming (updating future file 20). During the map2 stage, the ROPs and assigned renames are recorded in retire queue 32. Furthermore, the ROPs upon which each ROP is dependent are determined. Each ROP may be register dependent upon earlier ROPs as recorded in the future file, and may also exhibit other types of dependencies (e.g. dependencies on a previous serializing instruction, etc.)

The generated ROPs are written into scheduler 36 during the write scheduler stage. Up until this stage, the ROPs located by a particular line of information flow through the pipeline as a unit. However, subsequent to be written into scheduler 36, the ROPs may flow independently through the remaining stages, at different times Generally, a particular ROP remains at this stage until selected for execution by scheduler 36 (e.g. after the ROPs upon which the particular ROP is dependent have been selected for execution, as described above). Accordingly, a particular ROP may experience one or more clock cycles of delay between the write scheduler write stage and the read scheduler stage. During the read scheduler stage, the particular ROP participates in the selection logic within scheduler 36, is selected for execution, and is read from scheduler 36. The particular ROP then proceeds to read register file operations from one of register files 38A–38B (depending upon the type of ROP) in the register file read stage.

The particular ROP and operands are provided to the corresponding execution core 40A or 40B, and the instruction operation is performed on the operands during the execution stage. As mentioned above, some ROPs have several pipeline stages of execution. For example, memory instruction operations (e.g. loads and stores) are executed through an address generation stage (in which the data address of the memory location accessed by the memory instruction operation is generated), a translation stage (in which the virtual data address provided by the address generation stage is translated) and a pair of data cache stages in which D-cache 44 is accessed. Floating point operations may employ up to 4 clock cycles of execution, and integer multiplies may similarly employ up to 4 clock cycles of execution.

Upon completing the execution stage or stages, the particular ROP updates its assigned physical register during the register file write stage. Finally, the particular ROP is retired after each previous ROP is retired (in the retire stage). Again, one or more clock cycles may elapse for a particular ROP between the register file write stage and the retire stage. Furthermore, a particular ROP may be stalled at any stage due to pipeline stall conditions, as is well known in the art.

Address Generation

Figure 3:
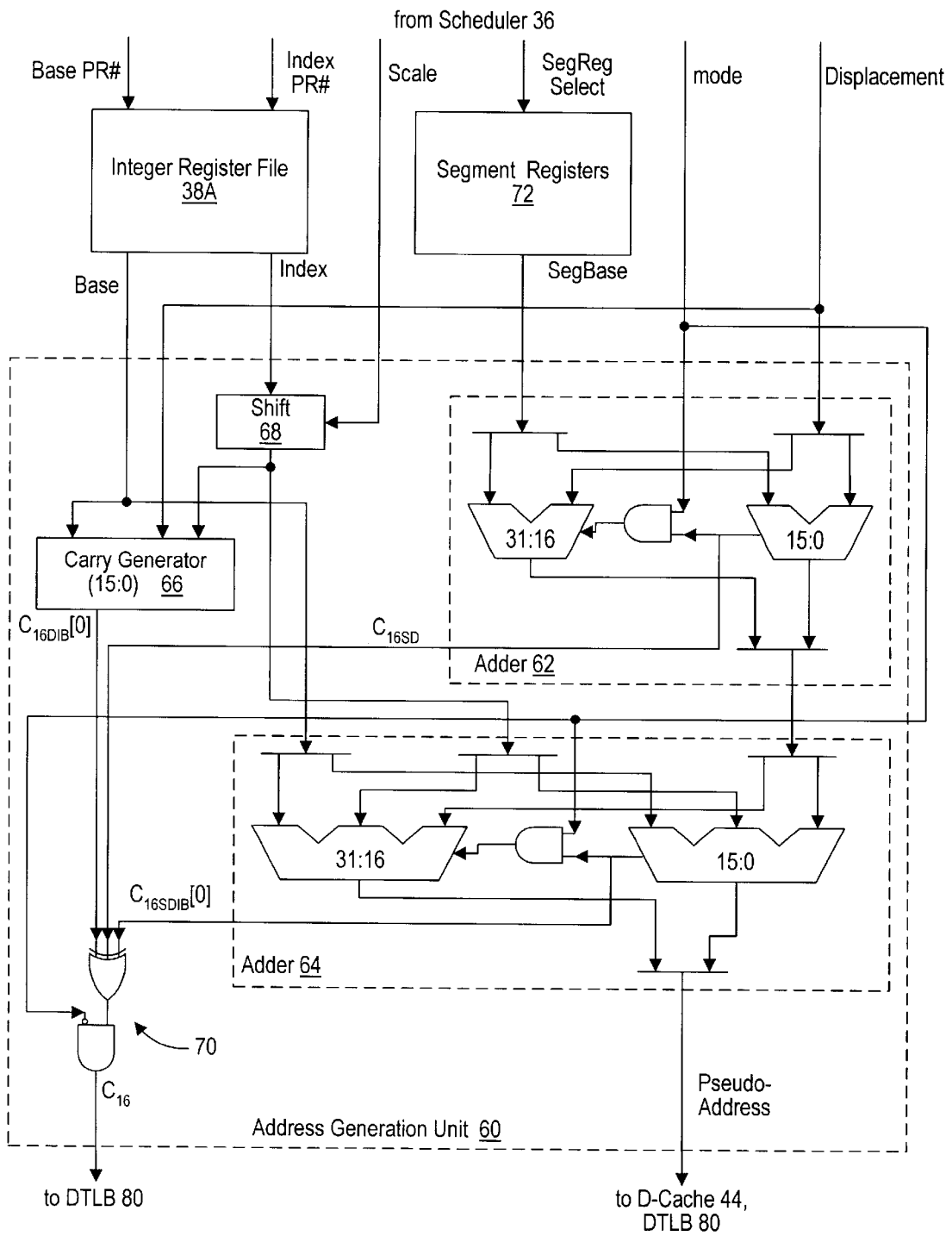
FIG. 3 is a block diagram of one embodiment of an address generation unit (AGU) which may be included in the processor of FIG. 1.

Turning next to FIG. 3, a block diagram of one embodiment of an address generation unit (AGU) 60 is shown. Other embodiments are possible and contemplated. In the embodiment of FIG. 3, AGU 60 includes a first adder 62, a second adder 64, a carry generator 66, a shift unit 68, and a carry logic 70. Additionally shown in FIG. 3 is integer register file 38A and segment registers 72. Integer register file 38A is coupled to receive base and index PR#s from scheduler 36 and to provide corresponding base and index operands to AGU 60. Segment registers 72 are coupled to receive a segment register selection (SegReg Select in FIG. 3) from scheduler 36 and to provide a corresponding segment base (SegBase in FIG. 3) to AGU 60. AGU 60 is further coupled to receive a scale, a mode signal, and a displacement operand from scheduler 36. More particularly, first adder 62 is coupled to receive the segment base, displacement, and mode signal and is coupled to provide a first sum to second adder 64 and a carry signal $C_{16SD}$ to carry logic 70. Shift unit 68 is coupled to receive the index operand and scale, and is coupled to provide the shifted index operand to carry generator 66 and second adder 64. Carry generator 66 and second adder 64 are coupled to receive the base operand, and carry generator 66 is further coupled to receive the displacement operand and to provide a carry signal $C_{16DIB}$ to carry logic 70. Second adder 64 is coupled to provide an output value (labeled pseudo-address in FIG. 3) to D-cache 44 and a data translation lookaside buffer (DTLB) 80 (shown in FIG. 4). Carry logic 70 is coupled to provide a carry signal $C_{16}$ to DTLB 80.

Generally, scheduler 36 selects load/store memory operations for execution once dependencies of those load/store memory operations are satisfied. A memory operation is an instruction operation which causes the transfer of data between a memory location (which may be in cache) and the processor. A load memory operation causes the transfer of data from memory to the processor, and a store memory operation causes the transfer of data from the processor to memory. The memory operation may be derived from an instruction which has a memory operand, or may be a pure load or store instruction specifying a memory operand. Scheduler 36 conveys the base and index PR#s to integer register file 38A, which provides the corresponding base and index operands to AGU 60. The index operand may optionally be scaled by 2, 4, or 8 (which results in a shift of the index operand by one, two, or three bits), and hence the scale is provided to shift unit 68 which appropriately shifts the index operand. Scheduler 36 provides the segment register selection to segment registers 72, which provide the corresponding segment base to AGU 60. Scheduler 36 also provides a mode signal indicating whether or not the addressing mode is 16 bit for the memory operation. AGU 60 adds the operands to produce a pseudo-address and carry signal $C_{16}$. The pseudo-address is provided to D-cache 44 and DTLB 80, and the $C_{16}$ signal is provided to DTLB 80. As will be described in greater detail below, in some cases the pseudo-address is the virtual address of the memory operand, and in some cases is a value which may not be the virtual address but which may be used, in conjunction with the $C_{16}$ signal, to determine the virtual address. More particularly, AGU 60 zeros the carries from the sixteenth to the seventeenth bit in 16 bit addressing mode when adding the address operands and segment base to produce the pseudo-address. In parallel, AGU 60 determines if a carry from the sixteenth bit to the seventeenth bit is generated when adding the logical address and the segment base (the carry signal $C_{16}$).

AGU 60 provides for rapid address generation in both 32 bit and 16 bit addressing modes, while handling the carry between the sixteenth bit and the seventeenth bit (bits 15 and 16 as numbered in FIG. 3) in the manner defined for 16 bit addressing mode. The displacement and segment base may both be available earlier in time than the base and index operands for a given address generation. The displacement is a constant in the instruction, and thus is available directly from scheduler 36. The segment registers 72 are relatively few in number, and therefore may be accessed more rapidly than the larger integer register file 38A. For example, segment registers 72 may be implemented as discrete registers rather than a random access memory (RAM). Accordingly, first adder 62 adds the segment base and displacement operands to produce a first sum while the index and base operands are read from integer register file 38A. First adder 62 receives the mode signal and, if the mode signal indicates 16 bit addressing mode, first adder 62 zeros the carry-in to bit 16 of the first sum (illustrated by the AND gate in adder 62 between the adder producing the least significant 16 bits (15:0) and the most significant 16 bits (31:16)). In the illustration, the mode signal being a binary zero indicates 16 bit addressing mode, and causes the carry-in to the most significant bits adder to be zero. In 32 bit addressing mode, the carry-out of the least significant bits adder is provided to the most significant bits adder. Additionally, the carry-out from bit 15 (the $C_{16SD}$ signal) is provided to carry logic 70.

Second adder 64 receives the first sum from first adder 62 and the base and index operands, and adds the values to produce the pseudo-address. By adding the segment base and displacement while the base and index operands are being read, a three input adder may be used to generate the pseudo-address and thus the overall delay in producing the address may be reduced as compared to performing a four input add, or as compared to adding the base, index and displacement first and then adding the segment base. Similar to first adder 62, second adder 64 zeros the carry-in to bit 16 if the mode signal indicates 16 bit addressing mode and provides the carry-out of bit 15 as the carry-in to bit 16 in 32 bit addressing mode. It is noted that, since second adder 64 is a three input adder, the carry is a two bit quantity. Similar to the discussion above for first adder 62, the pseudo-address produced by second adder 64 is the virtual address of the memory operand in 32 bit addressing mode. On the other hand, since the carry-in to bit 16 is always zero in 16 bit addressing mode, the pseudo-address may or may not be the virtual address of the memory operand in 16 bit address mode (since a carry-in to bit 16 bit is defined to be preserved when adding the segment base to the logical address). Additionally, the least significant bit of the carry-out from bit 15 (the $C_{16SDIB}[0]$ signal) is provided to carry logic 70.

In 16 bit addressing mode, the most significant bits of the virtual address are either the segment base[1:16] or the segment base[31:16]+1. This is true because the other operands are defined to be added (as sixteen bit quantities) with all carries discarded, creating a sixteen bit logical address which is then added to the 32 bit segment base (and thus at most a carry of one will be generated). For AGU 60, the operands provided in 16 bit addressing mode may be sixteen bit quantities zero-extended to 32 bits. Thus, pseudo-address [31:16] is equal to segment base[31:16] in 16 bit addressing mode. Accordingly, the pseudo-address is the virtual address if a carry is not generated from the sixteenth bit to the seventeenth bit of the sum of the segment base and the logical address. If a carry is generated, the least significant 16 bits of the pseudo-address equal the least significant 16 bits of the virtual address, and the remaining bits are the most significant bits of the segment base (which, as a quantity, is one less than the most significant bits of the virtual address).

Carry generator 66 and carry logic 70 are used to determine if a carry occurs between the sixteenth bit and the seventeenth bit of the sum of the logical address and the segment base. The indication of the carry is transmitted by carry logic 70 as the carry signal $C_{16}$. The carry out of the sixteenth bit (bit 15) of the sum of base, index, and displacement (generated by carry generator 66) and the sum of the segment base, base, index, and displacement will differ by at most one. If the carry-outs differ, the difference is the carry generated by adding the segment base to the logical address. Accordingly, a comparison of the carry out of the two sums can be used to determine the carry signal $C_{16}$. More particularly, the least significant bit of the carry-outs may be compared since a difference of zero or one are the only mathematical possibilities. However, the carry-out for the sum of the segment base, base, index, and displacement is not directly generated in AGU 60. Instead, the carry-outs from adders 62 and 64 together represents the carry. The equations below illustrate how the carries are combined to determine the $C_{16}$ signal, where only the 16 bit portion of the addition is considered and the function TR in equation 1 represents truncation of carries. Equation 1 illustrates the desired carry ($C_{16}$) to be determined:

$$2^{16}*C_{16}+S_1[15:0]=\text{Segbase}[15:0]+\text{TR}(\text{Base}[15:0]+\text{Index}[15:0]+\text{Disp}[15:0]) \quad (1)$$

Equations 2–4 illustrate the carries generated by first adder 62, second adder 64, and carry generator 66, respectively.

$$2^{16}*C_{16SD}+S_2[15:0]=\text{Segbase}[15:0]+\text{Disp}[15:0] \quad (2)$$

$$2^{16}*C_{16SDIB}[1:0]+S_1[15:0]=S_2[15:0]+\text{Base}[15:0]+\text{Index}[15:0] \quad (3)$$

$$2^{16}*C_{16DIB}[1:0]+S_3[15:0]=\text{Base}[15:0]+\text{Index}[15:0]+\text{Disp}[15:0] \quad (4)$$

Substituting $S_2$ as defined in equation 2 into equation 3 yields equation 5:

$$2^{16}*(C_{16SDIB}[1:0]+C_{16SD})+S_1[15:0]=\text{Segbase}[15:0]+\text{Disp}[15:0]+\text{Base}[15:0]+\text{Index}[15:0] \quad (5)$$

In equation 4, note that $S_3$ is the same as TR(Base[15:0]+Index[15:0]+Disp[15:0]) in equation 1, and substitute to form equation 6:

$$2^{16}*(C_{16}+C_{16DIB}[1:0])+S_1[15:0]=\text{Segbase}[15:0]+\text{Base}[15:0]+\text{Index}[15:0]+\text{Disp}[15:0] \quad (6)$$

Comparing equations 5 and 6, equation 7 can be derived:

$$C_{16}=C_{16SDIB}[1:0]+C_{16SD}-C_{16DIB}[1:0] \quad (7)$$

As mentioned above and as equation 7 shows, the difference between $C_{16DIB}[1:0]+C_{16SD}$ and $C_{16DIB}[1:0]$ is either one or zero, and represents the desired carry $C_{16}$. Accordingly, $C_{16SD}$ can be used to invert the binary sense of $C_{16SDIB}[0]$ (if $C_{16SD}$ and $C_{16SDIB}[0]$ differ) and the corresponding value can be compared to $C_{16DIB}[0]$ to determine $C_{16}$ (where $C_{16}$ is set if $C_{16DIB}[0]$ and the inverted binary sense of $C_{16SDIB}[0]$ differ). This is an exclusive OR of the three values, as shown in equation 8:

$$C_{16}=C_{16SDIB}[0] \text{ XOR } C_{16SD} \text{ XOR } C_{16DIB}[0] \quad (8)$$

Accordingly, carry logic 70 exclusive ORs the provided carry signals. Additionally, carry logic 70 qualifies the resulting $C_{16}$ signal with the mode signal, so that the $C_{16}$ signal is zero in 32 bit addressing mode and is generated according to the various carries in 16 bit addressing mode. In 16 bit addressing mode, if the $C_{16}$ signal is asserted, the pseudo-address is not the virtual address of the memory operand. Instead, the most significant 16 bits of the pseudo-address need to be incremented to form the virtual address. However, rather than actually perform the increment of the segment base and select the incremented or non-incremented segment base, AGU 60 as illustrated in FIG. 3 provides the pseudo-address and the $C_{16}$ signal to DTLB 80. DTLB 80 stores addresses in the same form as provided by AGU 60, allowing for additional savings in the address generation latency. DTLB 80 provides physical addresses to D-cache 44 for tag comparison to determine a hit.

It is noted that one or more of the displacement, base, or index operands may not be used in a given instruction. The corresponding operands provided to AGU 60 for those instructions may be zero.

It is noted that, while adders 62 and 64 are illustrated herein as having a least significant portion and a most significant portion with logic in between to zero the carry or pass the carry based on the mode, the illustrations are meant to be illustrative only. Depending upon the actual adder implementation, the carry may be zeroed in any suitable fashion. For example, in a carry lookahead adder or a carry save adder, the carry-in to the seventeenth bit may be zeroed.

On the other hand, a carry select adder may be implemented by selecting the non-carry sum for the most significant bits. Any suitable adder circuitry may be employed.

It is noted that AGU 60 and DTLB 80 may be part of integer execution core 40A. Furthermore, while AGU 60 is shown as a dedicated address generation unit, other embodiments may implement the address generation unit as part of a general arithmetic/logic unit (ALU). In other words, the adders used for address generation may also be used to perform ALU operations, if desired. Additionally, multiple AGUs may be implemented, if desired, to concurrently execute multiple memory operations. The multiple AGUs may access one or more DTLBs, as desired.

Figure 4:
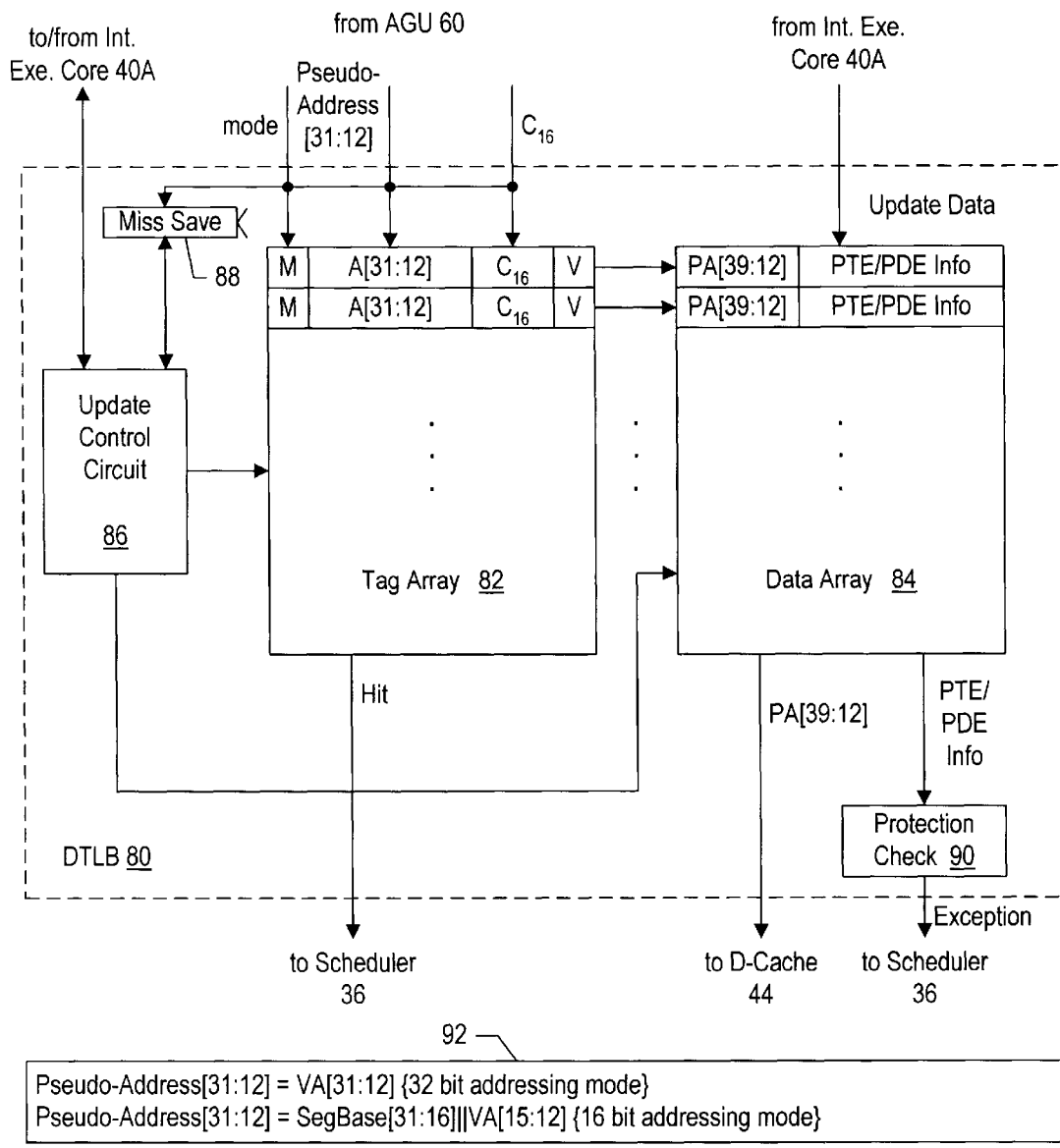
FIG. 4 is a block diagram of one embodiment of a translation lookaside buffer (TLB) which may be employed with the AGU shown in FIG. 3.

Turning next to FIG. 4, a block diagram of one embodiment of DTLB 80 is shown. Other embodiments are possible and contemplated. In the embodiment of FIG. 4, DTLB 80 includes a tag array 82, a data array 84, an update control circuit 86, a miss save register 88, and a protection check circuit 90. Tag array 82 and miss save register 88 are coupled to receive the pseudo-address, carry signal $C_{16}$, and mode signal from AGU 60. Additionally, tag array 82 is coupled to data array 84 and update control circuit 86, and is further coupled to provide a hit signal to scheduler 36. Miss save register 88 is coupled to update control circuit 86, which is farther coupled to integer execution core 40A. Data array 84 is coupled to receive update data from integer execution core 40A, to provide a physical address (PA) to D-cache 44, and to provide PTE/PDE information to protection check circuit 90, which is coupled to provide an exception signal to scheduler 36.

Generally, DTLB 80 is configured to search the address translations cached therein for virtual addresses provided by AGU 60. If a hit is detected for a virtual address, the corresponding physical address is provided from data array 84 and tag array 82 asserts the hit signal. Additionally, certain information from the translation table entry used to translate the address (e.g. the PTE/PDE information) is cached in data array 84 and is provided to protection check circuit 90. Protection check circuit 90 detects any protection violations using the translation information and the type of access, and signals an exception if a violation is detected.

More particularly, tag array 82 comprises a plurality of entries, each entry storing a mode field (M) an address field (A[31:12]), a carry field ($C_{16}$), and a valid bit (V). Data array 84 comprises a plurality of entries, each of which is assigned to a corresponding entry in tag array 82. The entries in data array 84 store the physical address corresponding to the virtual address identified by the corresponding tag entry and the PTE/PDE information from the corresponding page table entries used to translate the virtual address. Tag array 82 may comprise a content addressable memory (CAM), with the match line for each tag array entry selecting the corresponding entry in data array 84. In one embodiment, DTLB 80 may comprise 128 entries, although any number of entries may be employed.

For addresses generated in 16 bit addressing mode, the address field of the corresponding tag entry stores a value matching the pseudo-address which is generated for that address. In other words, the most significant bits of the address field are the segment base corresponding to the address, and the least significant bits match the virtual address of the memory operand. A box 92 in FIG. 4 illustrates the pseudo-address bits provided to and stored by DTLB 80 for both 32 bit addressing mode and 16 bit addressing mode. The address field in each tag entry is defined in the same fashion. The carry field stores the value of the carry signal ($C_{16}$) which corresponds to that address as well. For 32 bit addressing mode addresses, the carry field is clear. Both the address field and the carry field are matched against the corresponding values from AGU 60, and a hit is not detected unless both fields match and the corresponding valid bit is set. If aliasing between 16 bit addressing mode translation entries and 32 bit translation mode entries is not desired, the mode signal and mode field may be compared as well. The mode field identifies which entries are 16 bit addressing mode entries and which are not.

If a miss is detected for a particular memory operation, miss save register 88 stores the pseudo-address, $C_{16}$, and mode signals. The lack of a hit signal assertion for the memory operation may inform scheduler 36 that a DTLB miss has been detected and that the translation tables (e.g. page directory tables and page tables, as defined in the x86 instruction set architecture) are to be searched to find a corresponding translation. In one embodiment, if a memory operation is speculative and misses DTLB 80, scheduler 36 re-executes the memory operation non-speculatively and miss save register 88 captures the corresponding information during the non-speculative operation. In the present embodiment, translation table searches may be performed via a microcode routine in MROM unit 28. Thus, update control circuit 86 may communicate with integer execution core 40A to receive the newly fetched address translation into tag array 82 and data array 84. Generally, update control circuit 86 allocates an entry in tag array 82 and data array 84 for the newly fetched address translation. Any suitable replacement policy may be used. For example, a not most recently used (NMRU) policy may be used. In an NMRU policy, a replacement pointer may be implemented. When a TLB fill is performed, the entry indicated by the replacement pointer is replaced with the new information. The replacement pointer is incremented after each access, unless the increment causes the pointer to indicate the entry which hits during that access. Thus, the pointer indicates an entry which is not the most recently used entry. The information from miss save register 88 is stored into that allocated tag entry, and integer execution core 40A provides the translation table information including the physical address and the PTE/PDE information to data array 84 for storage.

Another instruction which affects DTLB 80 is the invalidate page instruction. This instruction is defined to invalidate one page of translation information from the DTLB. However, since the page address of 16 bit addressing mode pages may not be accurately reflected in DTLB 80 (i.e. the $C_{16}$ bit may be set), certain 16 bit addressing mode pages might not be invalidated when the invalidate page instruction is executed. Since each entry stores the mode bit (M) indicating whether or not the corresponding address translation is a 16 bit addressing mode translation, DTLB 80 may invalidate all of the 16 bit addressing mode translations in response to the invalidate page instruction. Additionally, any matching 32 bit address mode pages may be invalidated.

In one embodiment, a page may be defined to be 4 kilobytes, 2 Megabytes, or 4 Megabytes in size. Tag array 82 may store additional information identifying which size page is mapped by a given entry, and corresponding portions of the address field are don't cared for such entries. However, a 16 bit addressing mode mapping relies on some of these don't care bits to accurately map a page. In one particular embodiment, if a 16 bit addressing mode translation is found to be a 2 Megabyte or 4 Megabyte translation, DTLB 80 stores the page mapping as if it were a 4 kilobyte page. Thus, the 16 bit addressing mode operates correctly. Alternatively, DTLB 80 and AGU 60 may be designed to use more significant bits and a corresponding carry signal to correctly translate 16 bit addressing mode pages which are defined to be 2 or 4 Megabytes.

It is noted that, although the above discussion refers to 16 bit and 32 bit addressing modes, embodiments are contemplated in which a 64 bit addressing mode is also provided. An AGU 60 supporting 64 bit addressing modes would include an adder large enough to support the number of bits of virtual address in 64 bit mode, which may be less than 64 bits (e.g. 40–48 bits, or any number of bits up to and including 64 bits, depending upon the definition of the 64 bit addressing mode). The adders would still provide for zeroing the carry between the sixteenth and seventeenth bit, as described above. Furthermore, DTLB 80 would provide additional bits in the address field (and physical address field) to accommodate the larger number of address bits. The number of physical address bits may be 64 bits or less than 64 bits as well, and the number of physical address bits may differ from the number of virtual address bits.

Figure 5:
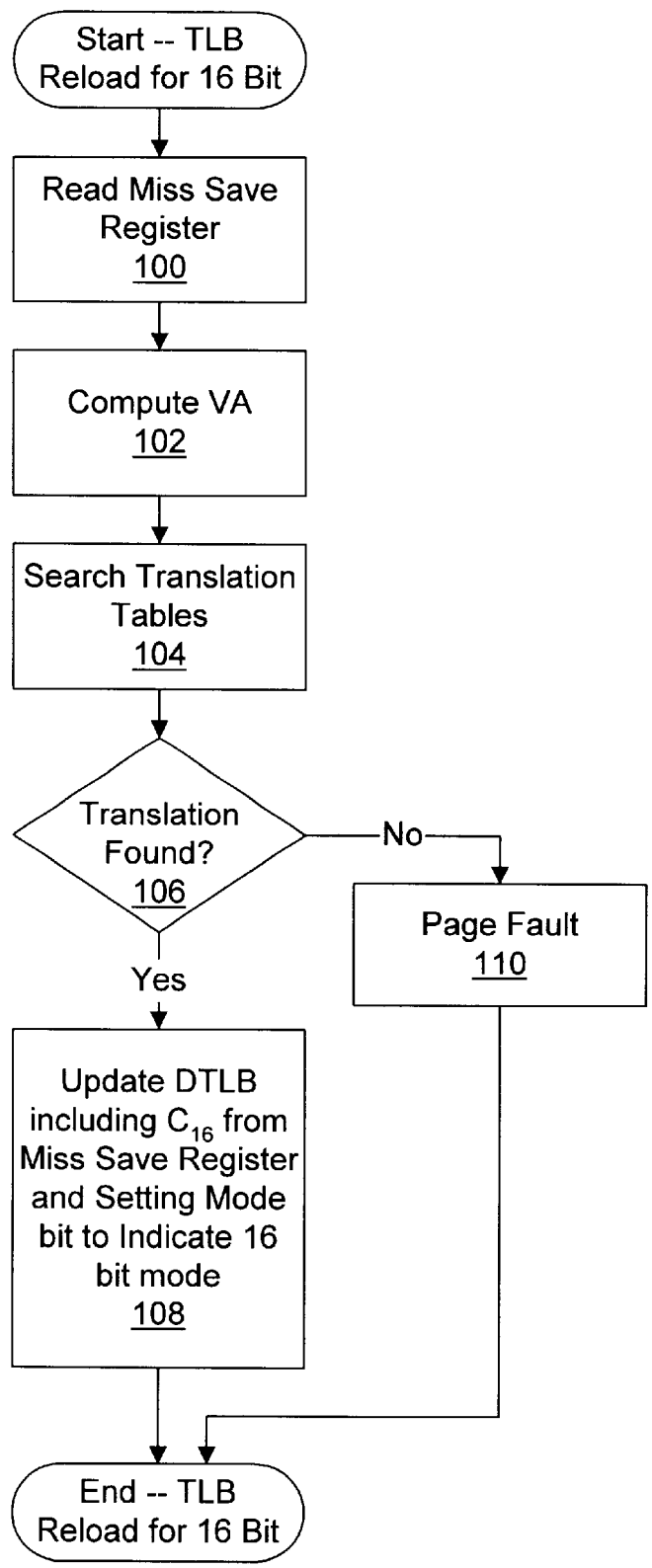
FIG. 5 is a flowchart illustrating an exemplary microcode routine which may be used to reload a TLB entry in response to a TLB miss.

Turning now to FIG. 5, a flowchart is shown illustrating an exemplary microcode routine which may be used in response to a DTLB miss for a 16 bit addressing mode virtual address. Other embodiments are possible and contemplated. Although the steps shown in the flowchart of FIG. 5 are shown in a particular order for ease of understanding, any suitable order may be used. Additionally, the exemplary microcode routine may include other steps for translating a non-16 bit addressing mode address, or a separate microcode routine may be used for such addresses. Alternatively, the 16 bit addressing mode TLB miss, the non-16 bit address mode TLB miss, or both may be handled in dedicated hardware instead of microcode.

The microcode routine begins by reading the information stored in miss save register 88 (step 100). The information may be read by dispatching an instruction to integer execution core 40A, which communicates with update control circuit 86 to receive the contents of the miss save register and stores the information into a microcode temporary register (as mapped into integer register file 38A). Using the miss save information, the virtual address of the miss is calculated (step 102). More particularly, if the $C_{16}$ bit is set, the pseudo-address (exclusive of the least significant 16 bits) may be incremented and the corresponding value concatenated with the least significant bits of the pseudo-address to provide the virtual address. The virtual address (along with certain other processor resources, such as the CR3 register) is then used to search the translation tables as defined in the instruction set architecture employed by the processor (step 104). For example, the translation tables may include the page directory and page tables defined by the x86 instruction set architecture. If the search is successful (decision block 106), the microcode routine communicates the translation information to DTLB 80 for storage, including causing the storage of the $C_{16}$ bit from miss save register 88 and setting the mode field of the entry to indicate 16 bit addressing mode (step 108). On the other hand, if the search is unsuccessful (decision block 106), a page fault is signalled (step 110). The page fault may involve, for example, branching to another microcode routine which handles page faults.

Figure 6:
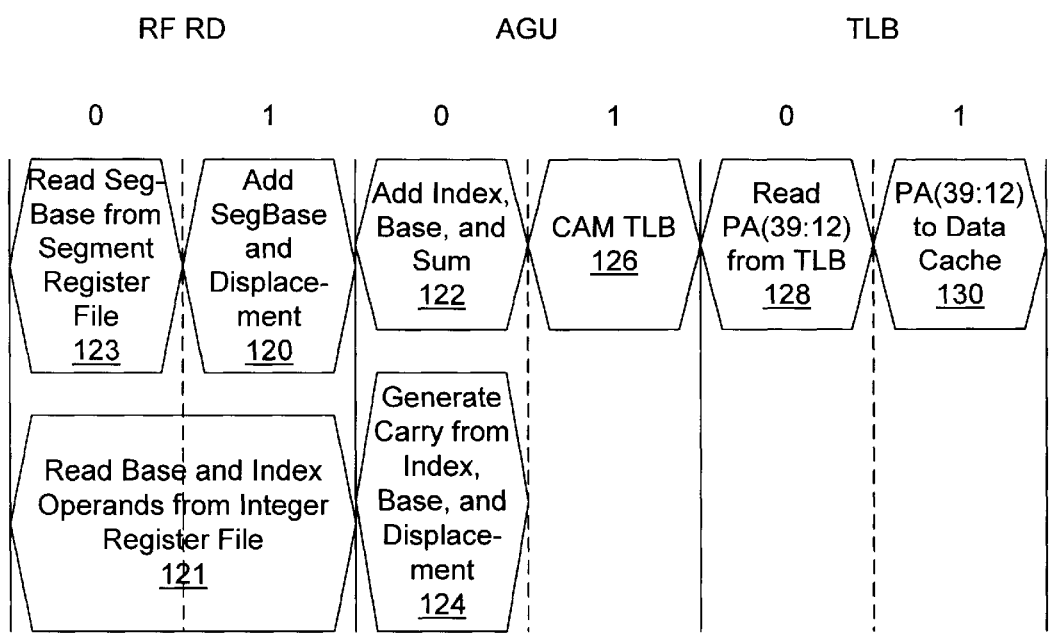
FIG. 6 is a timing diagram illustrating operation of one embodiment of the AGU shown in FIG. 3 and the TLB shown in FIG. 4 in the pipeline shown in FIG. 2.

Turning next to FIG. 6, an exemplary timing diagram for load memory operations is illustrated, highlighting the operation of one embodiment of AGU 60 and one embodiment of DTLB 80 according to the pipeline shown in FIG. 2. Other embodiments are possible and contemplated. More particularly, the register file read, AGU, and TLB stages are shown, delimited by vertical solid lines. Each stage is divided into phase zero and phase one (separated by a dashed vertical line). The phases are defined by the high and low periods of the clock signal clocking the pipeline.

During phase zero of the register file read stage, the segment base is read from the segment register file 72 (reference numeral 123). During phase one of the register file read stage, first adder 62 adds the segment base and displacement, producing the first sum and the $C_{16SD}$ signal (reference numeral 120). Additionally, the base and index operands are read from integer register file 38A during the register file read stage (reference numeral 121). During phase zero of the AGU stage, second adder 64 adds the first sum and the index and base operands, producing the pseudo-address and the $C_{16SDIB}$ signal (reference numeral 122). In parallel, carry generator 86 generates the carry from the index, base, and displacement and carry logic 70 generates the $C_{16}$ signal (reference numeral 124). The pseudo-address and $C_{16}$ signal are provided to DTLB 80, which CAMs the values against tag array 82 during phase one of the AGU stage (reference numeral 126). The selected data array entry is read (reference numeral 128) and the physical address is provided to D-cache 44 for tag comparison (reference numeral 130).

For the embodiment illustrated via FIG. 6, flops, latches, registers, or other clocked storage devices may be inserted into the embodiment of FIG. 3 to store intermediate values for pipelining to the next stage. For example, flops may capture the first sum, $C_{16SD}$ signal, and base and index values for use in the AGU stage. Other embodiments may insert the pipeline storage devices at different points. For example, a second AGU is contemplated for executing store memory operations. The second AGU may operate one phase delayed from that shown in FIG. 6 (e.g. SegBase and Displacement may be added in phase zero of the AGU stage, the first sum and index and base operands may be added in phase one of the AGU stage, etc.). The pipeline storage devices may be added at different points for such an embodiment.

Figure 7:
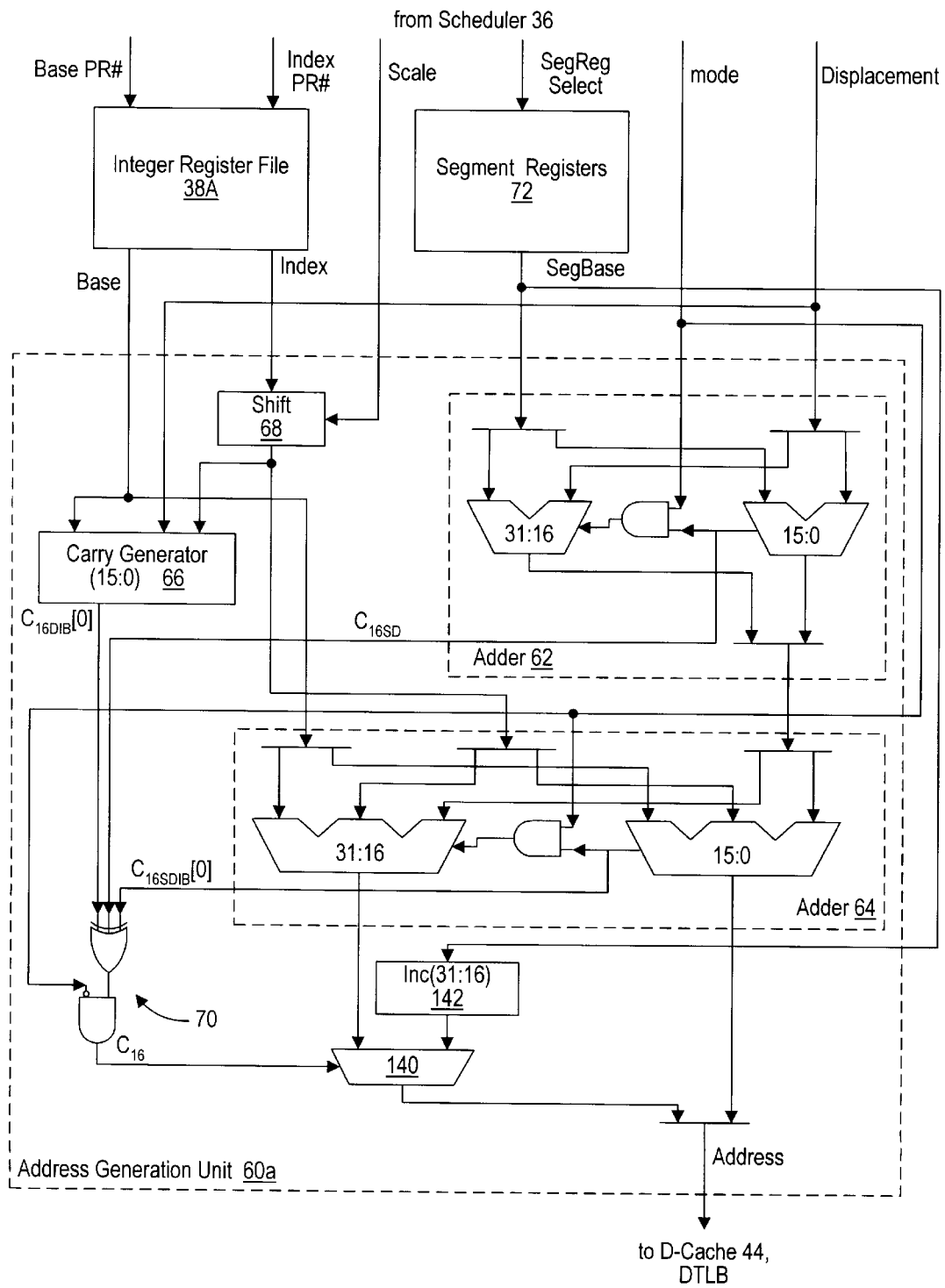
FIG. 7 is a block diagram of another embodiment of the AGU shown in FIG. 3.

Turning now to FIG. 7, a block diagram of a second embodiment of AGU 60 (AGU 60a) is shown. AGU 60a includes first adder 62, second adder 64, carry generator 66, shift unit 68, and carry logic 70 similar to AGU 60. However, the $C_{16}$ signal generated by carry logic 70 is coupled to a multiplexor (mux) 140. Mux 140 is coupled to provide the portion of the virtual address exclusive of the least significant sixteen bits, which are provided by second adder 64. Mux 140 receives the pseudo-address generated by second adder 64 (exclusive of the least significant sixteen bits) as an input, and the segment base most significant bits incremented by an incrementor 142 as another input. If the $C_{16}$ signal is asserted, mux 140 selects the incremented segment base. If the $C_{16}$ signal is deasserted, mux 140 selects the output of second adder 64. In this manner, the address provided by AGU 60a is the virtual address in both 16 bit and non-16 bit addressing modes. Thus, AGU 60a may be used with a conventional DTLB.

Computer Systems

Figure 8:
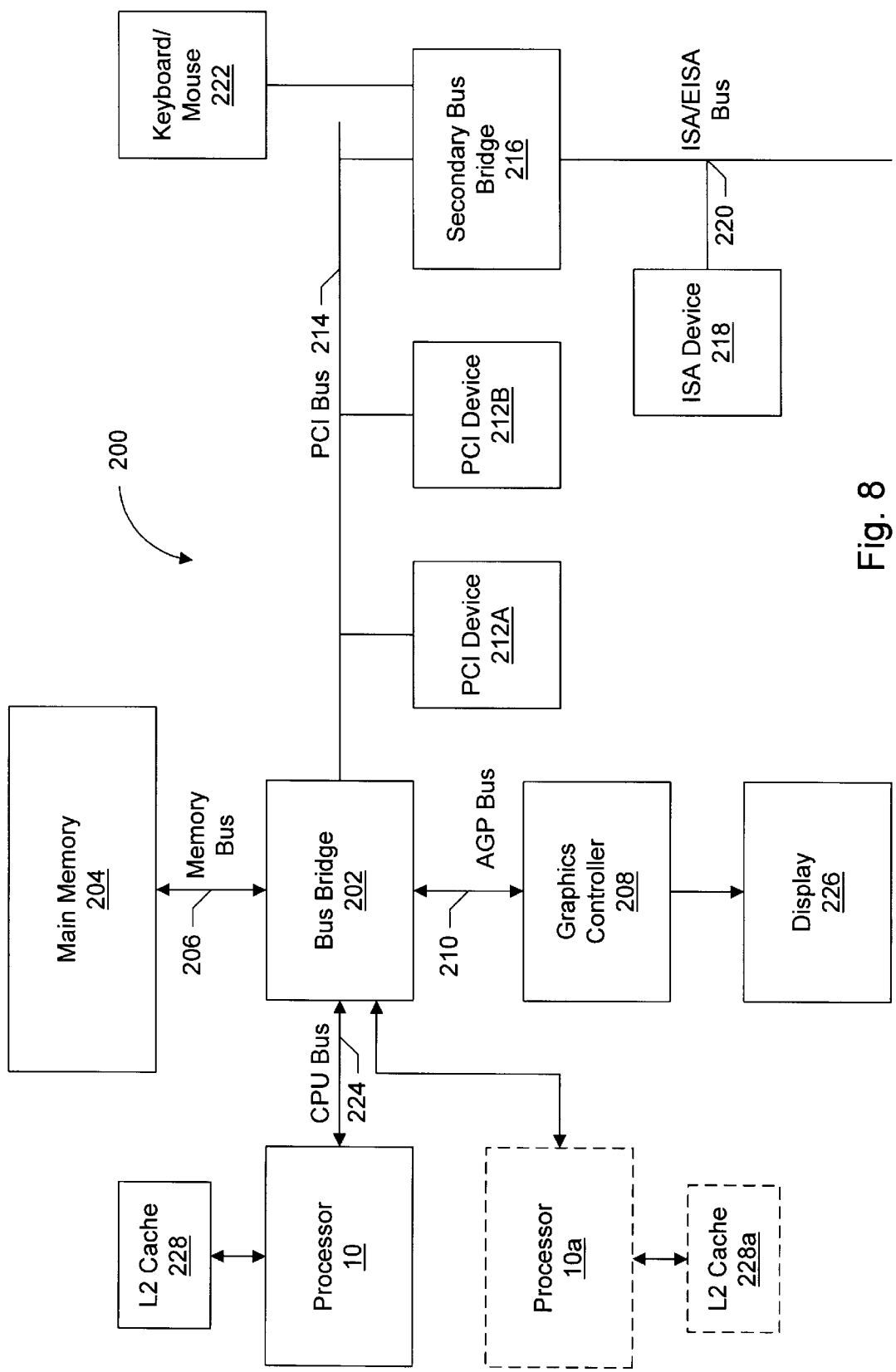
FIG. 8 is a block diagram of one embodiment of a computer system including the processor shown in FIG. 1.

Turning now to FIG. 8, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may flier be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 8) or may share CPU bus 224 with processor 10. Furthermore, processor 10a may be coupled to an optional L2 cache 228a similar to L2 cache 228.

Figure 9:
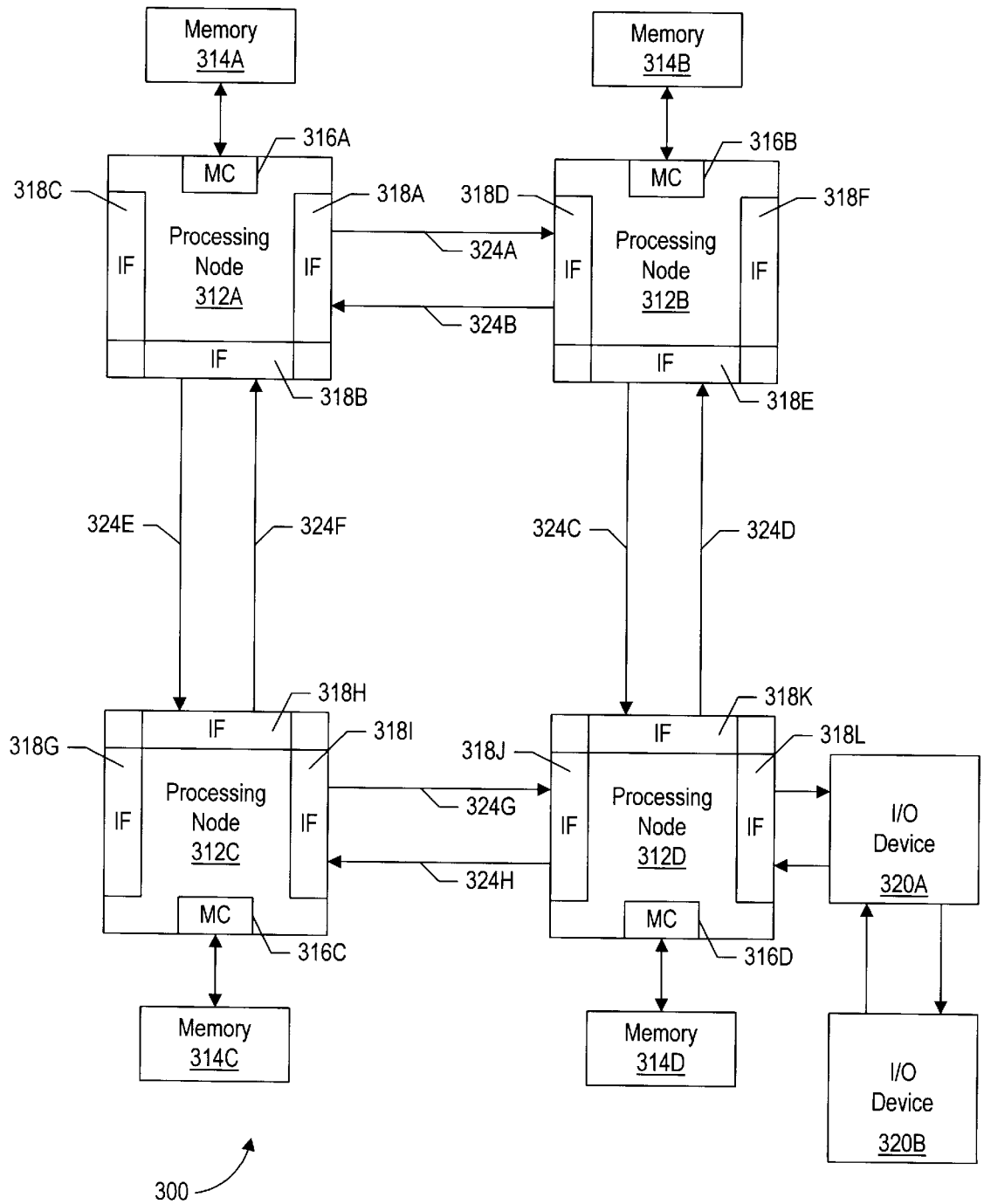
FIG. 9 is a block diagram of a second embodiment of a computer system including the processor shown in FIG. 1.

Turning now to FIG. 9, another embodiment of a computer system 300 is shown. Other embodiments are possible and contemplated. In the embodiment of FIG. 9, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 9. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 9. Any suitable routing algorithm may be used. Other embodiments of computer system 300 may include more or fewer processing nodes then the embodiment shown in FIG. 9.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A processor comprising:
an address generation unit (AGU) coupled to receive a segment base, one or more address operands of an instruction, and a mode signal identifying whether or not an addressing mode of said instruction is 16 bit, wherein said AGU includes adder circuitry configured to add said segment base and said one or more address operands to produce a value, and wherein said adder circuitry is further configured to zero a carry-in to a seventeenth bit of said value in response to said mode signal indicating that said addressing mode is 16 bit, and wherein said adder circuitry is configured to zero said carry-in independent of whether or not an addition of said segment base to a sum of said one or more address operands causes said carry-in to be a one, and wherein said AGU further includes a carry circuit configured to generate a first carry signal indicative of a carry-in to said seventeenth bit of a virtual address of a memory operand of said instruction according to an instruction set architecture defining said instruction, said carry circuit coupled to receive said mode signal and to generate said first carry signal in response to said mode signal, and wherein said first carry signal does not affect the generation of the value by the adder circuitry.

2. The processor as recited in claim 1 wherein one of said one or more address operands is a displacement, and wherein said adder circuitry comprises a first adder coupled to receive said segment base, said displacement, and said mode signal, and wherein said first adder is configured to add said segment base and said displacement to produce a first sum, and wherein said first adder is configured to zero a carry-in to said seventeenth bit of said first sum in response to said mode signal indicating that said addressing mode is 16 bit.

3. The processor as recited in claim 2 wherein said adder circuitry further includes a second adder coupled to receive said first sum, remaining ones of said one or more address operands, and said mode signal, and wherein said second adder is configured to add said first sum and said remaining ones of said one or more address operands to produce said value, and wherein said second adder is configured to zero a carry-in to said seventeenth bit of said value in response to said mode signal indicating that said addressing mode is 16 bit.

4. The processor as recited in claim 3 wherein said first adder and said second adder provide a carry-out of a sixteenth bit as said carry-in to said seventeenth bit in response to said mode signal indicating that said addressing mode is not 16 bit, and wherein said value comprises said virtual address of said memory operand if said mode signal indicates that said addressing mode is not 16 bit.

5. The processor as recited in claim 3 wherein a least significant 16 bits of said value comprise a least significant 16 bits of said virtual address of said memory operand if said mode signal indicates that said addressing mode is 16 bit, and wherein a remaining bits of said value comprise a most significant bits of said segment base if said mode signal indicates that said addressing mode is 16 bit.

6. The processor as recited in claim 5 wherein said value comprises said virtual address of said memory operation if said first carry signal is zero.

7. The processor as recited in claim 3 wherein said first adder is configured to generate a second carry signal indicative of a carry-out of a sixteenth bit of said first sum, and wherein said second adder is configured to generate a third carry signal indicative of a carry-out of a sixteenth bit of said value.

8. The processor as recited in claim 7 wherein said carry circuit comprises a carry generation circuit coupled to receive said one or more address operands and configured to generate a fourth carry signal indicative of a carry-out of a sixteenth bit of a sum of said one or more address operands.

9. The processor as recited in claim 8 wherein said carry circuit further comprises a circuit coupled to receive said second carry signal, said third carry signal, and said fourth carry signal, and wherein said circuit is configured to generate said first carry signal in response to said second carry signal, said third carry signal, and said fourth carry signal.

10. The processor as recited in claim 9 wherein said circuit is coupled to receive said mode signal, and wherein said circuit is configured to generate said first carry signal further in response to said mode signal.

11. The processor as recited in claim 10 wherein said circuit is configured to exclusive-or said second carry signal, said third carry signal, and said fourth carry signal and to qualify an exclusive-or result with said mode signal.

12. The processor as recited in claim 1 further comprising a translation lookaside buffer (TLB) coupled to receive said value and said first carry signal from said address generation unit, wherein said TLB is configured to provide a physical address of said memory operand in response to said value and said first carry signal.

13. The processor as recited in claim 12 wherein said TLB comprises a tag array configured to store a plurality of tags for comparison to said value and said first carry signal.

14. The processor as recited in claim 13 wherein one of said plurality of tags comprises a page portion of said value and a first carry corresponding to said first carry signal, and wherein said TLB provides a corresponding physical address.

15. The processor as recited in claim 14 wherein said one of said plurality of tags further includes a mode, and wherein said mode comprises an addressing mode corresponding to said one of said plurality of tags.

16. The processor as recited in claim 1 wherein said AGU further comprises an incrementor configured to increment a most significant portion of said segment base, and a multiplexor coupled to receive an output of said incrementor and a corresponding most significant portion of said value, and wherein said multiplexor is further coupled to receive said first carry signal as a selection control.

17. A computer system comprising:
a processor including an address generation unit (AGU) coupled to receive a segment base, one or more address operands of an instruction, and a mode signal identifying whether or not an addressing mode of said instruction is 16 bit, wherein said AGU includes adder circuitry configured to add said segment base and said one or more address operands to produce a value, and wherein said adder circuitry is further configured to zero a carry-in to a seventeenth bit of said value in response to said mode signal indicating that said addressing mode is 16 bit, and wherein said adder circuitry is configured to zero said carry-in independent of whether or not an addition of said segment base to a sum of said one or more address operands causes said carry-in to be a one, and wherein said AGU further includes a carry circuit configured to generate a first carry signal indicative of a carry-in to said seventeenth bit of a virtual address of a memory operand of said instruction according to an instruction set architecture employed by said processor, said carry circuit coupled to receive said mode signal and to generate said first carry signal in response to said mode signal, and wherein said first carry signal does not affect the generation of said value by said adder circuitry; and
an input/output (I/O) device configured to communicate between said computer system and another computer system to which said I/O device is couplable.

18. The computer system as recited in claim 17 wherein said I/O device is a modem.

19. The computer system as recited in claim 17 further comprising a second processor identical to said processor.

20. A method comprising:
summing one or more address operands of an instruction and a segment base to produce a value, wherein said summing comprises zeroing a carry-in to a seventeenth bit of said value responsive to an addressing mode of said instruction being 16 bit, and wherein said zeroing is independent of whether or not an addition of said segment base to a sum of said one or more address operands causes said carry-in to be a one; and
generating a first carry-in to said seventeenth bit of a virtual address of a memory operand of said instruction according to an instruction set architecture defining said instruction and in response to said addressing mode, wherein said first carry-in does not affect said summing.

21. The method as recited in claim 20 further comprising:
incrementing a most significant bits of said segment base; and
selecting a result of said incrementing instead of said most significant bits of said value in response to said first carry-in being set.

22. The method as recited in claim 20 further comprising:
providing said value and said first carry-in to a translation lookaside buffer (TLB); and
providing a physical address corresponding to said memory operand from said
TLB in response to said value and said first carry-in.

23. The method as recited in claim 20 wherein said summing comprises:
summing said segment base and a displacement, which is one of said one or more address operands of said instruction, to produce a first sum, wherein said summing said segment base and said displacement comprises zeroing a carry-in to said seventeenth bit of said first sum in response to said addressing mode being 16 bit; and
summing said first sum and remaining ones of said one or more address operands of said instruction to produce said value, wherein said summing said first sum and remaining ones of said one or more address operands comprises zeroing a carry-in to said seventeenth bit of said value in response to said addressing mode being 16 bit.

24. The computer system as recited in claim 17 further comprising a second processor including a second AGU coupled to receive a second segment base, a second one or more address operands of a second instruction, and a second mode signal identifying whether or not an addressing mode of said second instruction is 16 bit, wherein said second AGU includes second adder circuitry configured to add said second segment base and said second one or more address operands to produce a second value, and wherein said second adder circuitry is further configured to zero a carry-in to a seventeenth bit of said second value in response to said second mode signal indicating that said addressing mode is 16 bit, and wherein said second AGU further includes a second carry circuit configured to generate a second carry signal indicative of a carry-in to said seventeenth bit of a second virtual address of a second memory operand of said second instruction according to an instruction set architecture employed by said second processor, said second carry circuit coupled to receive said second mode signal and to generate said second carry signal in response to said second mode signal.

25. A processor comprising;
an address generation unit (AGU) coupled to receive a segment base, one or more address operands of an instruction, and a mode signal identifying an addressing mode of said instruction, wherein said AGU includes adder circuitry configured to add said segment base and said one or more address operands to produce a value, and wherein said adder circuitry is further configured to zero a carry-in to a first bit of said value in response to said mode signal indicating that said addressing mode is N bit, and wherein said adder circuitry is configured to zero said carry-in independent of whether or not an addition of said segment base to a sum of said one or more address operands causes said carry-in to be a one, wherein N is an integer greater than zero, and wherein the first bit is a next most significant bit to the Nth bit in the value, and wherein said AGU further includes a carry circuit configured to generate a first carry signal indicative of whether or not a carry-in to said first bit of a virtual address of a memory operand of said instruction is defined to occur according to an instruction set architecture defining said instruction, said carry circuit coupled to receive said mode signal and to generate said first carry signal in response to said mode signal, and wherein said first car signal does not affect the generation of said value by said adder circuitry.

26. The processor as recited in claim 25 wherein one of said one or more address operands is a displacement, and wherein said adder circuitry comprises a first adder coupled to receive said segment base, said displacement, and said mode signal, and wherein said first adder is configured to add said segment base and said displacement to produce a first sum, and wherein said first adder is configured to zero a carry-in to said first bit of said first sum in response to said mode signal indicating that said addressing mode is N bit.

27. The processor as recited in claim 26 wherein said adder circuitry further includes a second adder coupled to receive said first sum, remaining ones of said one or more address operands, and said mode signal, and wherein said second adder is configured to add said first sum and said remaining ones of said one or more address operands to produce said value, and wherein said second adder is configured to zero a carry-in to said first bit of said value in response to said mode signal indicating that said addressing mode is N bit.

28. The processor as recited in claim 27 wherein said first adder and said second adder provide a carry-out of said Nth bit as said carry-in to said first bit in response to said mode signal indicating that said addressing mode is not N bit, and wherein said value comprises said virtual address of said memory operand if said mode signal indicates that said addressing mode is not N bit.

29. The processor as recited in claim 27 wherein said first adder is configured to generate a second carry signal indicative of a carry-out of said Nth bit of said first sum, and wherein said second adder is configured to generate a third carry signal indicative of a carry-out of said Nth bit of said value.

30. The processor as recited in claim 29 wherein said carry circuit comprises a carry generation circuit coupled to receive said one or more address operands and configured to generate a fourth carry signal indicative of a carry-out of said Nth bit of a sum of said one or more address operands.

31. The processor as recited in claim 30 wherein said carry circuit further comprises a circuit coupled to receive said second carry signal, said third carry signal, and said fourth carry signal, and wherein said circuit is configured to generate said first carry signal in response to said second carry signal, said third carry signal, and said fourth carry signal.

32. The processor as recited in claim 31 wherein said circuit is coupled to receive said mode signal, and wherein said circuit is configured to generate said first carry signal further in response to said mode signal.

33. The processor as recited in claim 32 wherein said circuit is configured to exclusive-or said second carry signal, said third carry signal, and said fourth carry signal and to qualify an exclusive-or result with said mode signal.

34. The processor as recited in claim 25 further comprising a translation lookaside buffer (TLB) coupled to receive said value and said first carry signal from said address generation unit, wherein said TLB is configured to provide a physical address of said memory operand in response to said value and said first carry signal.

35. The processor as recited in claim 34 wherein said TLB comprises a tag array configured to store a plurality of tags for comparison to said value and said first carry signal.

36. The processor as recited in claim 35 wherein one of said plurality of tags comprises a page portion of said value and a first carry corresponding to said first carry signal, and wherein said TLB provides a corresponding physical address.

37. The processor as recited in claim 36 wherein said one of said plurality of tags further includes a mode, and wherein said mode comprises an addressing mode corresponding to said one of said plurality of tags.

38. The processor as recited in claim 25 wherein said AGU further comprises an incrementor configured to increment a most significant portion of said segment base, and a multiplexor coupled to receive an output of said incrementor and a corresponding most significant portion of said value, and wherein said multiplexor is further coupled to receive said first carry signal as a selection control.

* * * * *

UNITED STATES PATENT AND TRADEMARK OFFICE
CERTIFICATE OF CORRECTION

PATENT NO. : 6,363,471 B1
DATED : March 26, 2002
INVENTOR(S) : Meier et al.

Page 1 of 1

It is certified that error appears in the above-identified patent and that said Letters Patent is hereby corrected as shown below:

<u>Column 23,</u>
Line 23, please delete "car", and insert -- carry -- in place thereof.

Signed and Sealed this

Twenty-eighth Day of May, 2002

Attest:

Attesting Officer

JAMES E. ROGAN
*Director of the United States Patent and Trademark Office*